United States Patent
Yang et al.

(10) Patent No.: US 12,273,177 B2
(45) Date of Patent: Apr. 8, 2025

(54) ANTENNA SELECTION FOR UPLINK SIGNALS IN A WIRELESS COMMUNICATION SYSTEM

(71) Applicant: Nokia Solutions and Networks Oy, Espoo (FI)

(72) Inventors: Roy Yang, Buffalo Grove, IL (US); Phillip Rasky, Buffalo Grove, IL (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 350 days.

(21) Appl. No.: 17/760,577

(22) PCT Filed: Sep. 16, 2019

(86) PCT No.: PCT/US2019/051314
§ 371 (c)(1),
(2) Date: Mar. 15, 2022

(87) PCT Pub. No.: WO2021/054935
PCT Pub. Date: Mar. 25, 2021

(65) Prior Publication Data
US 2022/0352967 A1 Nov. 3, 2022

(51) Int. Cl.
*H04B 7/08* (2006.01)
*H04L 27/26* (2006.01)
*H04W 24/10* (2009.01)
*H04W 56/00* (2009.01)

(52) U.S. Cl.
CPC ....... *H04B 7/0808* (2013.01); *H04L 27/2607* (2013.01); *H04W 24/10* (2013.01); *H04W 56/001* (2013.01)

(58) Field of Classification Search
CPC .......................... H04W 56/001; H04W 24/10; H04L 27/2691; H04L 27/2607; H04L 27/26025
See application file for complete search history.

(56) References Cited

U.S. PATENT DOCUMENTS

2013/0286965 A1   10/2013   Xu et al.
2015/0237618 A1   8/2015   Hanson et al.
(Continued)

FOREIGN PATENT DOCUMENTS

CN   109644102 A   4/2019

OTHER PUBLICATIONS

International Search Report in International Application No. PCT/US2019/051314 mailed Jun. 8, 2020.
(Continued)

*Primary Examiner* — Chi Ho A Lee
(74) *Attorney, Agent, or Firm* — Lippes Mathias LLP (57) ABSTRACT

An aggregation unit includes a transceiver configured to transmit unique signals to a plurality of transmission reception points (TRxPs) for transmission by the plurality of TRxPs and receive uplink signals received by the plurality of TRxPs from a user equipment. The aggregation unit also includes a processor configured to generate a sum of the uplink signals from a subset of the plurality of TRxPs. The subset is determined based on measurements of the unique signals performed by the UE. In some cases, the subset is determined by a baseband unit that receives a measurement report including the measurements performed by the UE. The transceiver is configured to transmit the sum of the uplink signals to the baseband unit over a fronthaul link.

17 Claims, 9 Drawing Sheets

(56) References Cited

U.S. PATENT DOCUMENTS

| | | | | |
|---|---|---|---|---|
| 2016/0373283 | A1* | 12/2016 | Zeng | H04L 27/2623 |
| 2020/0145159 | A1* | 5/2020 | Tsai | H04L 5/0051 |
| 2020/0359404 | A1* | 11/2020 | Nilsson | H04B 7/088 |
| 2020/0389806 | A1* | 12/2020 | Charipadi | H04W 24/10 |
| 2021/0167821 | A1* | 6/2021 | Chen | H04B 7/0404 |
| 2021/0234591 | A1* | 7/2021 | Eleftheriadis | H04B 7/0626 |
| 2021/0360430 | A1* | 11/2021 | Reial | H04W 8/24 |
| 2022/0139426 | A1* | 5/2022 | Keeth | G11C 5/063 365/244 |
| 2022/0167279 | A1* | 5/2022 | Zhou | H04W 52/242 |
| 2022/0316767 | A1* | 10/2022 | Yamada | F25B 7/00 |
| 2023/0344497 | A1* | 10/2023 | Wang | H04B 7/0639 |

OTHER PUBLICATIONS

Texas Instruments: "Timing Advance in support of UL CoMP", 3GPP draft; R1-113789 Timing Advance in Support of UL Comp, 3$^{rd}$ Generation Partnership Project (3GPP), Mobile Competence Centre; 650 Route des Lucioles; F-06921 Sophia-Antipolis Cedex; France, vol. RAN WG1. No. 67 San Francisco, USA; Nov. 14, 2011-Nov. 18, 2011, Nov. 8, 2011 (Nov. 8, 2011), XP050561884, [retrieved on Nov. 8, 2011] p. 1-p. 2.

CATT: "Idle and Connected mode UE mobility based on SS-block measurements" 3GPP draft; R1-1712360 Idle and Connected mode UE mobility based on SS-block measurements 3$^{rd}$ Generation Partnership Project (3GPP), Mobile Competence Centre; 650 Route des Lucioles; F-06921 Sophia-Antipolis Cedex; France, vol. RAN WG1. No. 90 Prague, Czechia Aug. 21, 2017-Aug. 25, 2017 Aug. 20, 2017 (Aug. 20, 2017), XP051315176, retrieved from the Internet: URL:http://www.3gpp.org/ftp/Meetings3GPP_SYNC/RAN1/Docs/ [retrieved on Aug. 20, 2017] p. 1-p. 3.

Intel Corporation: "A Signaling Framework for UL CoMP", 3GPP draft; R1-120206 a Signaling Framework for UL CoMP 3$^{rd}$ Generation Partnership Project (3GPP), Mobile Competence Centre; 650 Route des Lucioles; F-06921 Sophia-Antipolis Cedex; France, vol. RAN WG1. No. 68, Dresden, Germany, Feb. 6, 2012-Feb. 10, 2012, Jan. 31, 2012 (Jan. 31, 2012), XP050562769, [retrieved on Jan. 31, 2012] p. 1-p. 3.

* cited by examiner

| SOURCE | STRENGTH |
|---|---|
| TRxP-1 | 4 |
| TRxP-2 | 8 |
| TRxP-3 | 10 |
| TRxP-4 | 2 |
| ⋮ | ⋮ |
| TRxP-N | 3 |

ANTENNA SELECTION FOR UPLINK SIGNALS IN A WIRELESS COMMUNICATION SYSTEM

BACKGROUND

Wireless communication systems such as single frequency networks (SFNs) and distributed antenna systems (DASs) are typically deployed in regions that have a relatively low user density distributed over a large or complex area. For example, SFN and DAS systems distribute multiple remote radio units (RRUs) to provide coverage within different rooms or floors of a building, thereby reducing the signal-blocking effects of walls, floors, or other obstructions. The RRUs are also referred to herein as transmission reception points (TRxPs). Each TRxP includes one or more antennas for transmitting a downlink signal provided to the TRxP by a baseband unit (BBU) in the base station to the user equipment and receiving uplink signals transmitted to the base station by user equipment. In regions with a lower user density, each TRxP may serve a small number of users and allocating a separate BBU to each TRxP is uneconomical. Instead, a single BBU is connected to multiple geographically separated TRxPs so that there is a one-to-many relationship between the BBU and the TRxPs. A fronthaul link connects one or more ports in the BBU to corresponding ports in an aggregation unit that distributes signals to the TRxPs. The baseband unit sends a downlink signal over the fronthaul link to the aggregation unit, which forwards copies of the downlink signal to the TRxPs. The same downlink signal is therefore transmitted simultaneously or concurrently from the TRxPs in the same frequency band. The aggregation unit also aggregates uplink signals received from the TRxPs and the aggregated uplink signals are transmitted over the fronthaul link to the baseband unit. However, the bandwidth of the fronthaul link is the same (or similar to) the bandwidth for a single connection to a TRxP. Consequently, the aggregated uplink signals are generated by summing or adding the uplink signals from the TRxPs to generate a single aggregated uplink signal for transmission over the fronthaul link.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. Some embodiments of the apparatus include a transceiver configured to transmit unique signals to a plurality of transmission reception points (TRxPs) for transmission by the plurality of TRxPs and receive uplink signals received by the plurality of TRxPs from a user equipment. The apparatus also includes a processor configured to generate a sum of the uplink signals from a subset of the plurality of TRxPs. The subset is determined based on measurements of the unique signals performed by the UE and the transceiver is configured to transmit the sum of the uplink signals to a baseband unit over a fronthaul link.

In some embodiments, the unique signals include a first synchronization signal block (SSB) that is transmitted by each of the plurality of TRxPs and a plurality of second SSBs that are selectively transmitted by different ones of the plurality of TRxPs.

Some embodiments of the transceiver are configured to transmit the first SSB to the plurality of TRxPs and a different one of the plurality of second SSBs to each of the plurality of TRxPs.

Some embodiments of the transceiver are configured to transmit the first SSB to the plurality of TRxPs and transmit a different one of the plurality of second SSBs to each TRxP in a first subset of the plurality of TRxPs in a first time interval and the different one of the plurality of second SSBs to each TRxP in a second subset of the TRxPs in a second time interval.

Some embodiments of the transceiver are configured to transmit the first SSB to the plurality of TRxPs and transmit different combinations of the plurality of second SSBs to encode identities of the plurality of TRxPs.

Some embodiments of the processor are configured to generate the unique signals by performing a Fast Fourier Transform (FFT) on a time domain signal received from the baseband unit to generate a frequency domain signal including subcarriers for the first SSB and the plurality of second SSBs, removing subcarriers associated with a subset of the second SSBs from the frequency domain signal, performing an inverse FFT (IFFT) on the frequency domain signal to form a modified time domain signal, and adding a cyclic prefix to the modified time domain signal.

Some embodiments of the processor are configured to generate the unique signals by removing unwanted subcarriers associated with second SSBs from a frequency domain signal received from the baseband unit, performing an inverse FFT (IFFT) on the frequency domain signal to form a modified time domain signal, and adding a cyclic prefix to the modified time domain signal.

In some embodiments, the unique signals include channel state information-reference signals (CSI-RS) transmitted by the plurality of TRxPs.

Some embodiments of the processor are configured to generate the unique signals by generating the second SSBs in response to instructions received from the baseband unit.

Some embodiments of the processor are configured to generate a mask that indicates the subset of the plurality of TRxPs.

Some embodiments of the processor are configured to filter uplink signals received from the plurality of TRxPs using the mask and to generate the sum by summing the filtered uplink signals.

In some embodiments, a baseband unit is provided. The baseband unit includes a transceiver configured to transmit a common signal to a plurality of transmission reception points (TRxPs) and to receive a measurement report from a user equipment. The plurality of TRxPs generate unique signals based on the common signal. The measurement report indicates signal strengths of the unique signals received by the user equipment from the plurality of TRxPs. The baseband unit also includes a processor configured to select, based on the measurement report, a subset of the plurality of TRxPs that are to be used for selective summing of uplink signals subsequently received from the user equipment.

Some embodiments of the processor are configured to select the subset of the plurality of TRxPs by comparing the signal strengths in the measurement report to a threshold signal strength.

Some embodiments of the processor are configured to include a TRxP in the subset in response to a corresponding signal strength exceeding the threshold signal strength.

Some embodiments of the processor are configured to generate a summing instruction. Some embodiments of the transceiver are configured to transmit the summing instruction to the aggregation unit, which uses the summing instruction to configure the aggregation unit to selectively sum uplink signals received from the subset of the set of TRxPs.

Some embodiments of the transceiver are configured to receive an aggregated uplink signal that is equal to a sum of the uplink signals received from the subset of the set of TRxPs.

Some embodiments of the common signal include a first synchronization signal block (SSB) and a plurality of second SSBs that are modified by the aggregation unit to uniquely indicate each of the plurality of TRxPs.

Some embodiments of the common signal include instructions to generate at least one of a first synchronization signal block (SSB) and a plurality of second SSBs at the aggregation unit to uniquely indicate each of the plurality of TRxPs.

In some embodiments, a method is provided. Some embodiments of the method include transmitting unique signals to a plurality of transmission reception points (TRxPs) for transmission by the plurality of TRxPs and receiving uplink signals received by the plurality of TRxPs from a user equipment. The method also includes generating a sum of the uplink signals from a subset of the plurality of TRxPs. The subset is determined based on measurements of the unique signals performed by the UE. The method further includes transmitting the sum of the uplink signals to a baseband unit over a fronthaul link.

In some embodiments, the unique signals include a first synchronization signal block (SSB) that is transmitted by the plurality of TRxPs and a plurality of second SSBs that are selectively transmitted by different ones of the plurality of TRxPs.

In some embodiments, transmitting unique signals includes transmitting the first SSB to the plurality of TRxPs and a different one of the plurality of second SSBs to each of the plurality of TRxPs.

In some embodiments, transmitting the unique signals includes transmitting the first SSB to the plurality of TRxPs and transmitting a different one of the plurality of second SSBs to each TRxP in a first subset of the plurality of TRxPs in a first time interval and the different one of the plurality of second SSBs to each TRxP in a second subset of the TRxPs in a second time interval.

In some embodiments, transmitting the unique signals includes transmitting the first SSB to the plurality of TRxPs and transmitting different combinations of the plurality of second SSBs to encode identities of the plurality of TRxPs.

In some embodiments, generating the unique signals includes performing a Fast Fourier Transform (FFT) on a time domain signal received from the baseband unit to generate a frequency domain signal including subcarriers for the first SSB and the plurality of second SSBs, removing unwanted subcarriers associated with second SSBs from the frequency domain signal, performing an inverse FFT (IFFT) on the frequency domain signal to form a modified time domain signal, and adding a cyclic prefix to the modified time domain signal.

In some embodiments, generating the unique signals includes removing unwanted subcarriers associated with second SSBs from a frequency domain signal received from the baseband unit, performing an inverse FFT (IFFT) on the frequency domain signal to form a modified time domain signal, and adding a cyclic prefix to the modified time domain signal.

Some embodiments of the method include generating a mask that indicates the subset of the plurality of TRxPs.

Some embodiments of the method include filtering uplink signals received from the plurality of TRxPs using the mask; and generating the sum by summing the filtered uplink signals.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Summing all the uplink signals received at an aggregation unit from a set of TRxPs degrades the quality of the aggregated uplink signal because of differences in the levels of signal, noise, and interference received at the TRxPs for a single user equipment. For example, the quality of the signal received from the user equipment is represented by the signal-to-noise ratio (SNR) or signal-to-interference-plus-noise ratio (SINR). A first user equipment (UE-A) is near a first RRU (RRU-A) and the received UE-A signal power at RRU-A is 5. The UE-A is further away from a second RRU (RRU-B) and the received UE-A signal power at RRU-B is 2. In this example, noise is omni-present and the noise power is 1 at both RRU-A and RRU-B. Thus, the SNR for UE-A at RRU-A is 5/1=5 and the SNR for UE-A at RRU-B is 2/1=2. If the signals received at RRU-A and RRU-B are summed, the UE-A signal level=5+2=7 and the combined noise level is 1+1=2, resulting in an SNR for the combined signal of 7/2=3.5, which is lower than the SNR of the signal received by RRU-A for UE-A. For another example, if there is another user equipment (UE-B) exchanging signals with a third RRU-C that belongs to a neighboring cell near RRU-B, then RRU-B also receives a signal from UE-B in addition to the noise power of 1 and the UE-A signal power of 2. If the UE-B signal power received at RRU-B is 1 then the combined signal from RRU-A and RRU-B for UE-A has a signal strength of 5+2=7 and noise plus interference of 1+1+1=3, which results in an SINR of 7/3=2.3 compared to an SINR of 5 for the UE_A signal received at RRU-A. Thus, the interference produced by the UE-B and received at RRU-B further degrades the quality of the summed signal for UE-A. The degradation of the signal quality impacts both the uplink, e.g., the physical uplink shared channel (PUSCH), and the downlink, e.g., due to degradation of the physical uplink control channel (PUCCH) that is used to transmit downlink control information (e.g., acknowledgment or negative acknowledgment messages) or degradation of the sounding reference signal (SRS) transmitted by the user equipment.

FIGS. 1-9 illustrate embodiments of techniques that improve the quality of aggregated uplink signals transmitted over a fronthaul link between a baseband unit and an aggregation unit for a set of TRxPs associated with a base station by selectively summing uplink signals received from a subset of the set of TRxPs based on measurements performed by the user equipment on unique signals transmitted by the set of TRxPs. The TRxPs in the set transmit a first synchronization signal block (SSB) and different subsets of a plurality of second SSBs within corresponding geographic areas. In some embodiments, each TRxP transmits the first SSB and a different one of the plurality of second SSBs so that reception of one of the second SSBs indicates the transmitting TRxP. For example, the aggregation unit can perform a Fast Fourier Transform (FFT) on a time domain signal received from the baseband unit to recover frequency domain subcarriers and remove unwanted second SSBs' subcarriers before performing an inverse FFT (IFFT) and adding a cyclic prefix to a new time domain signal for transmission by the TRxP. For another example, the aggregation unit removes unwanted second SSBs' subcarriers from a frequency domain signal received from the baseband unit before performing the IFFT and cyclic prefix addition. Some embodiments of base stations repartition the functionalities between baseband unit and the aggregation unit by moving the SSB signal generation function to the aggregation unit. In that case, the aggregation unit generates the first SSB and TRxP-unique second SSB signals based on instruction from the baseband unit. For example, the baseband unit can insert instructions to generate the first SSB and TRxP-unique second SSB signals into the common downlink signals that are transmitted from the baseband unit to the aggregation unit.

The base station instructs the user equipment to send measurement reports indicating measured signal strengths of the second SSBs. Based on the measurement reports, the base station identifies a subset of the TRxPs that are associated with relatively strong measured SSB signal strengths and then configures the aggregation unit to sum uplink signals received from the user equipment by the subset. For example, the base station can set a threshold signal strength and instruct the aggregation unit to sum uplink signals received from the user equipment by TRxPs that have a signal strength (indicated in the measurement report) that is above the threshold signal strength. Uplink signals that have a signal strength below the threshold signal strength are filtered or dropped. In some embodiments, the base station determines the subset of the TRxPs based on measurements of the signal strength of other signals in addition to (or instead of) measurements of the signal strength of the second SSBs. For example, the user equipment can measure the signal strength of the second SSBs and the signal strength of channel state information-reference signals (CSI-RS) that is used by user equipment to estimate the channel and report channel quality information (CQI) to the base station. The transmitting TRxPs are identified by a combination of the information in the second SSB and the CSI-RS, which increases the number of TRxPs in the set that are uniquely identified by the transmitted signals. In some embodiments, the second SSBs are "rotated" to different TRxPs in different time intervals to extend the number of TRxPs that are identified by the second SSBs. In some embodiments, combinations of the second SSBs are used to encode the identity of the TRxP that is transmitting the combination.

Figure 1:
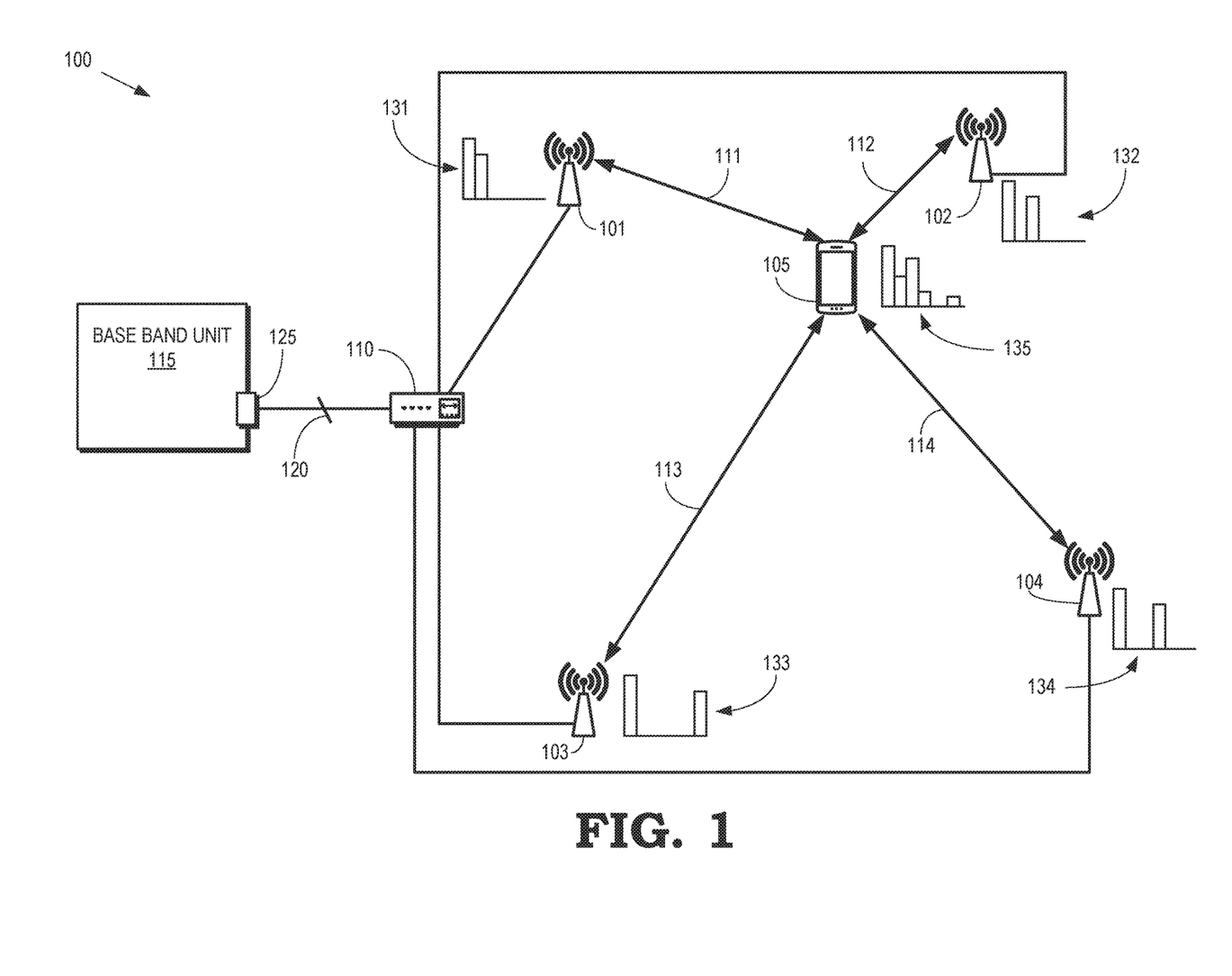
FIG. 1 is a block diagram of a communication system that implements antenna selection for uplink signals according to some embodiments.

FIG. 1 is a block diagram of a communication system 100 that implements antenna selection for uplink signals according to some embodiments. The communication system 100 implements a single frequency network (SFN), distributed antenna system (DAS), or other broadcast network that supports multiple geographically separated remote radio units (RRUs), which are referred to herein as transmission reception points (TRxPs) 101, 102, 103, 104 or, collectively, the TRxPs 101-104. Each of the TRxPs 101-104 includes one or more antennas that support uplink and downlink communication over an air interface to one or more user equipment 105 (only one shown in FIG. 1 in the interest of clarity) via wireless connections 111, 112, 113, 114, which are collectively referred to herein as "the wireless connections 111-114." The TRxPs 101-104 are connected to an aggregation unit 110 via a wired connection, a wireless connection, or a combination thereof. The aggregation unit 110 is connected to a baseband unit (BBU) 115 via a fronthaul link 120 that supports a bandwidth that is the same as (or similar to) the bandwidth supported between the aggregation unit 110 and one of the TRxPs 101-104. In some embodiments, the TRxPs 101-104, the aggregation unit 110, and the BBU 115 are collectively referred to as a "base station."

The BBU 115 provides downlink signals to the aggregation unit 110 for distribution to the TRxPs 101-104. Some embodiments of the BBU 115 include one or more ports 125 that are connected to corresponding ports in the aggregation unit 110 via the fronthaul link 120. The downlink signals are therefore transmitted to the aggregation unit 110 via the one or more ports 125. The downlink signals include frequency domain signals that convey symbols in one or more subcarriers at different frequencies or time domain signals that represent one or more symbols. The time domain signals are converted into frequency domain signals using techniques such as a Fast Fourier Transform (FFT) and the frequency domain signals are converted into time domain signals using inverse techniques such as an inverse FFT (IFFT). The aggregation unit 110 distributes the signals to the TRxPs 101-104, which transmit the signals simultaneously or concurrently over the air interface towards the user equipment 105. For example, if the aggregation unit 110 transmits a frequency domain signal having subcarriers within a frequency band, each of the TRxPs 101-104 simultaneously or concurrently transmit the same frequency domain signal in the same frequency band.

Uplink signals from the user equipment 105 are conveyed over the wireless connections 111-114 to the corresponding TRxPs 101-104. The signals received by the TRxPs 101-104 include desired uplink signals from the user equipment 105, ambient noise, and interference from other transmitting entities such as other user equipment that are proximate to one or more of the TRxPs 101-104. The received signals are transmitted to the aggregation unit 110, which sums the received signals from the TRxPs 101-104 to form a summed signal that is transmitted to the baseband unit 115 over the fronthaul link 120. However, as discussed herein, summing the uplink signals received from all the TRxPs 101-104 degrades the quality of the summed uplink signal because of differences in the levels of signal, noise, and interference received at the TRxPs 101-104 from the user equipment 105. Thus, instead of summing all the signals received from the TRxPs 101-104, the aggregation unit 110 selectively sums uplink signals received from a subset of the TRxPs 101-104 that have relatively high-quality communication links with the user equipment 105.

The subset of the TRxPs 101-104 are selected based on information in measurement reports generated by the user equipment 105 and provided to the base station. The measurement reports are generated based on measurements of unique signals transmitted by the TRxPs 101-104 and the unique signals uniquely identify the TRxPs 101-104 that transmitted the unique signal. In some embodiments, a common signal is generated at the BBU 115 and provided to the aggregation unit 110, which generates unique signals for the TRxPs 101-104 and distributes the unique signals to the corresponding TRxPs 101-104. For example, the aggregation unit 110 generates a unique signal that identifies the TRxP 101 from the common downlink signal received from BBU 115. The aggregation unit 110 also performs other operations to customize the common downlink signal such as removing unwanted SSBs, performing FFT/IFFT operations, and the like. The aggregation unit 110 then transmits this unique signal to the TRxP 101. The aggregation unit 110 does not transmit this unique signal to the TRxPs 102-104 and instead generates different unique signals for each of the TRxPs 102-104.

Some embodiments of the BBU 115 transmit synchronization signal blocks (SSBs) including a first SSB one or more second SSBs over the fronthaul 120 to the aggregation unit 110. The aggregation unit 110 distributes the first SSB to all the TRxPs 101-104. The aggregation unit 110 also modifies the one or more second SSBs to generate a set of second SSBs that uniquely identify the TRxPs 101-104. The (common) first and (unique, TRxP-specific) second SSBs are transmitted from the aggregation unit 110 to the TRxPs 101-104. In the illustrated embodiment, the aggregation unit 110 transmits the first SSB to all the TRxPs 101-104 and transmits different ones of the second SSBs to the different TRxPs 101-104. For example, the aggregation unit 110 transmits a signal 131 including the first SSB and a first one of the second SSBs to the TRxP 101. The aggregation unit 110 also transmits a signal 132 including the first SSB and a second one of the second SSBs to the TRxP 102, a signal 133 including the first SSB and a third one of the second SSBs to the TRxP 103, and a signal 134 including the first SSB and a fourth one of the second SSBs to the TRxP 104. The TRxPs 101-104 then transmit the corresponding signals 131-134 to the user equipment 105 over the corresponding communication links 111-114.

In some embodiments, the baseband unit 115 does not generate the first and second SSBs. Instead, the baseband unit 115 generates instructions that are transmitted to the aggregation unit 110, which generates the first SSB that is common to all the TRxPs 101-104 and unique second SSBs that identify each of the TRxPs 101-104, as discussed herein. The first SSB is then provided to all of the TRxPs 101-104 and the unique second SSBs are provided to the corresponding TRxPs 101-104.

The user equipment 105 receives the signals 131-134 and identifies the corresponding TRxPs 101-104 based on the received signals 131-134. For example, the user equipment 105 receives the signal 131 and identifies the TRxP 101 based on receiving the first SSB and the first one of the second SSBs in the signal 131. The user equipment 105 also performs measurements on the received signals 131-134. The measurements include measurements of signal strength or signal quality such as a received signal strength indicator (RSSI), a reference signal received power (RSRP), a reference signal received quality (RSRQ), a signal-to-noise ratio (SNR), a signal-to-interference-plus-noise ratio (SINR), and the like. The user equipment 105 then compiles or combines the results of the measurements into a measurement report 135 that includes information representing the results of the measurements performed on the unique signal received from the TRxPs 101-104. The user equipment 105 forwards the measurement report 135 to the base station. The signals 131-134 are transmitted, and the measurement report 135 is generated, periodically, at predetermined time intervals, or in response to triggering events.

The base station selects a subset of the TRxPs 101-104 based on the measurement report 135 received from the user equipment 105. The selection is performed at the aggregation unit 110, the BBU 115, or at another entity within the base station. In some embodiments, the base station compares the values that indicate the signal strength or quality of the different TRxPs 101-104 to a threshold value. The TRxPs 101-104 that have a signal strength/quality value above the threshold are added to the subset and the TRxPs 101-104 that have a signal strength/quality value below the threshold are not included in the subset. The threshold value corresponds to a threshold proximity or path loss in the TRxPs 101-104. The TRxPs 101-104 that have signal strength/quality values above the threshold are within a proximity distance or path loss that indicates that signals received from the user equipment 105 at the TRxPs in the subset have a relatively high SNR or SINR and should therefore be summed to form the summed signal that is transmitted from the aggregation unit 110 to the BBU 115.

In some embodiments, the number of TRxPs 101-104 is larger than the number of available second SSBs. Additional information is therefore used to uniquely identified the TRxPs 101-104. For example, beam refinement signals formed using channel state information-reference signals (CSI-RS) may be combined with the second SSBs to uniquely identify a larger number of TRxPs 101-104. In that case, the base station combines SSB-based measurements with CSI-RS base measurements to determine whether to add one of the TRxPs 101-104 to the subset for selective summing. For another example, the second SSBs can be rotated among the TRxPs 101-104 in different time intervals. Thus, different TRxP are identified by the same second SSB being transmitted in different time intervals such as a second SSB being transmitted by the TRxP 101 in a first time interval and the same second SSB being transmitted by the TRxP 102 in a second time interval. For yet another example, subsets of the second SSBs can be used to encode identities of the TRxP 101-104. Different TRxPs are then identified by different combinations of the second SSBs, e.g., the TRxP 101 is uniquely identified based on receiving first and second ones of the second SSBs and the TRxP 102 is uniquely identified based on receiving third and fourth ones of the second SSBs. Information indicating the selected subset of the TRxPs 101-104 is then transmitted to the aggregation unit 110, which uses the information to generate a mask or otherwise filter uplink signals associated with the user equipment 105 that are received from the TRxPs 101-104. The mask or filter is implemented in the aggregation unit 110 or other entity connected to the aggregation unit 110. Based on the mask, the aggregation unit 110 sums uplink signals received from the selected subset of the TRxPs 101-104. For example, if the mask indicates that the TRxP 101 and the TRxP 103 are in the selected subset, the aggregation unit 110 generates the summed signal by summing the uplink signals received from the TRxP 101 and the TRxP 103, while ignoring, dropping, or filtering out uplink signals received from the TRxP 102 and the TRxP 104. The aggregation unit 110 then transmits the summed signal over the fronthaul link 120 to the BBU 115.

Figure 2:
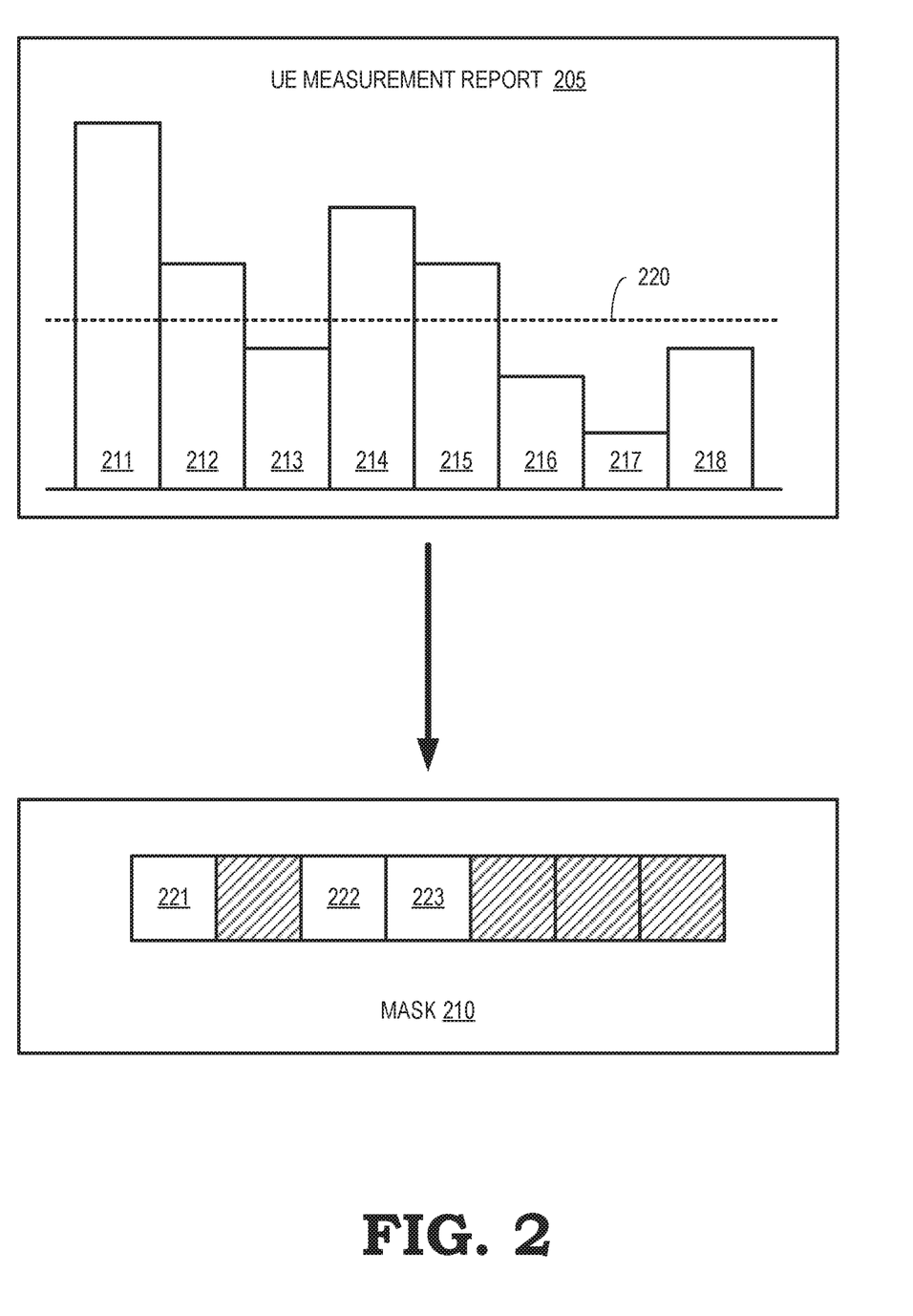
FIG. 2 is a block diagram of a measurement report generated by a user equipment and a mask that is created based on the measurement report according to some embodiments.

FIG. 2 is a block diagram of a measurement report 205 generated by a user equipment and a mask 210 that is created based on the measurement report 205 according to some embodiments. The measurement report 205 is generated by some embodiments of the user equipment 105 shown in FIG. 1 and the mask is created by some embodiments of the aggregation unit 110 shown in FIG. 1.

The measurement report 205 includes information indicating values of signal strength or quality indicators that are determined based on measurements of signals that are received from (and uniquely identified) a set of TRxPs. In the illustrated embodiment, the value 211 represents the signal strength/quality of a first SSB that is transmitted by all the TRxPs in the set. The values 212, 213, 214, 215, 216, 217, 218 (collectively referred to herein as "the values 212-218") represent the signal strength or quality of second SSBs received from corresponding TRxPs. Each of the second SSBs uniquely identifies one of the TRxPs. Thus, up to seven TRxPs are uniquely identified by the second SSBs that are measured to generate the values 212-218. The number of TRxPs that are uniquely identified by signals received at the user equipment is increased in some embodiments using additional signals (such as CSI-RS), transmitting the second SSBs in multiple time intervals, or encoding the identities of the TRxPs using different combinations of the second SSBs.

The baseband unit in the base station compares the values 212-218 to a threshold value 220. The TRxPs associated with values 212-218 that are larger than the threshold value 220 are added to a subset and the TRxPs associated with values 212-218 that are less than the threshold value 220 are not added to the subset. In the illustrated embodiment, the TRxPs associated with the values 212, 214, 215 are added to the subset. Information indicating the subset is then transmitted to an aggregation unit (such as the aggregation unit 110 shown in FIG. 1), which uses this information to define the mask 210 for selecting uplink signals from the corresponding TRxPs. In the illustrated embodiment, the mask 210 includes seven elements that correspond to the seven TRxPs associated with the values 212-218. The elements 221, 222, 223 are "enabled" to indicate that uplink signals received from the corresponding TRxPs are summed to create the summed uplink signal that is transmitted from the aggregation unit to the baseband unit. The remaining elements are crosshatched to indicate that uplink signals received from the corresponding TRxPs are not summed to create the summed uplink signal.

Figure 3:
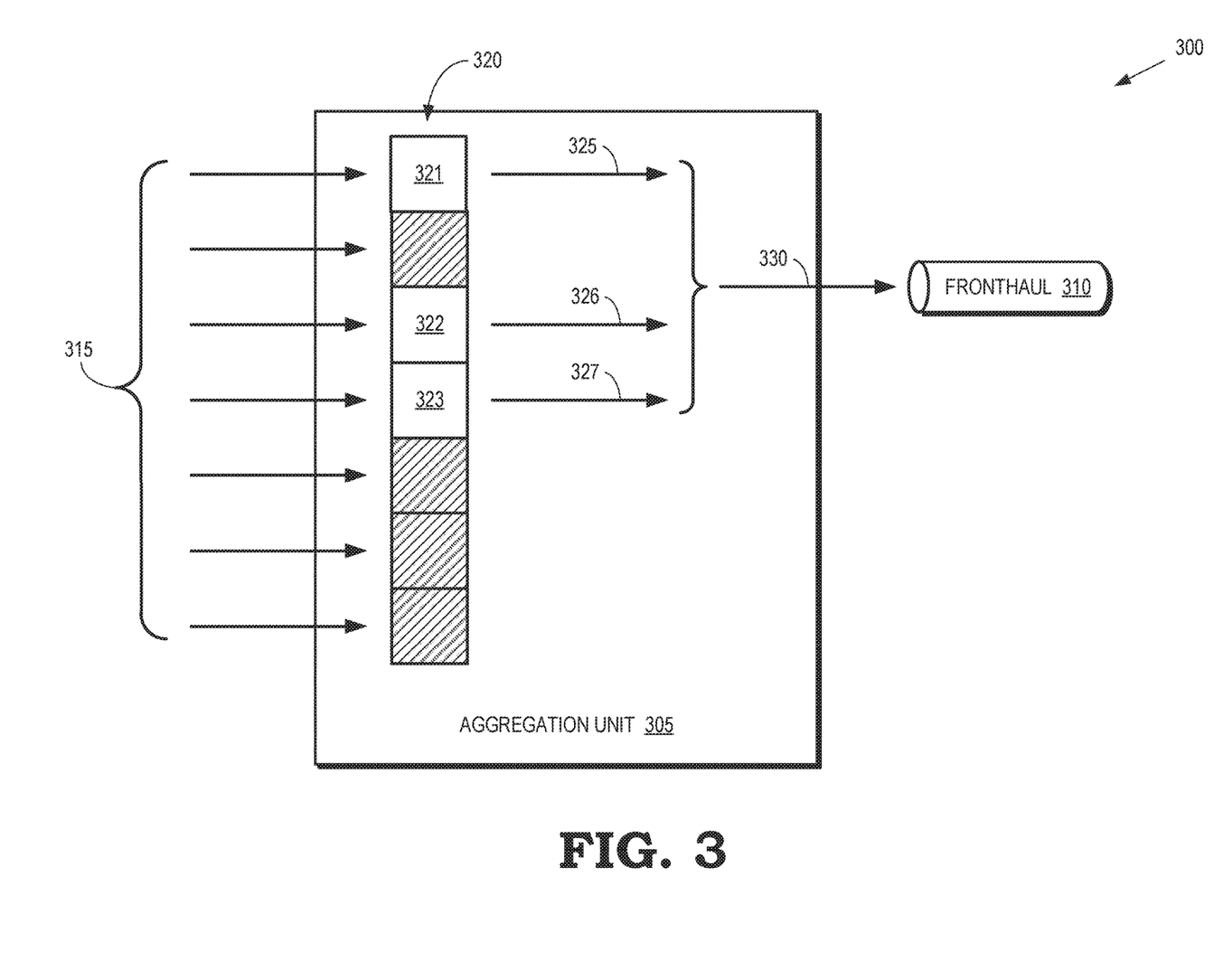
FIG. 3 is a block diagram illustrating a portion of a wireless communication system including an aggregation unit and a fronthaul link according to some embodiments.

FIG. 3 is a block diagram illustrating a portion 300 of a wireless communication system including an aggregation unit 305 and a fronthaul link 310 according to some embodiments. The aggregation unit 305 is used to implement some embodiments of the aggregation unit 110 shown in FIG. 1 and the fronthaul link 310 is used to implement some embodiments of the fronthaul link 120 shown in FIG. 1.

The aggregation unit 305 receives a set of uplink signals 315 from a corresponding set of TRxPs. The set of uplink signals 315 is filtered using a mask 320 such as some embodiments of the mask 210 shown in FIG. 2. The elements 321, 322, 323 of the mask 320 are enabled to indicate a subset of the set of uplink signals 315 that are to be summed to create a summed uplink signal for transmission to a baseband unit such as the baseband unit 115 shown in FIG. 1. The aggregation unit 305 therefore filters the set of uplink signals 315 to generate a subset including the uplink signals 325, 326, 327, which are collectively referred to herein as "the subset 325-327." The aggregation unit 305 then sums the subset 325-327 to form the summed uplink signal 330, which is provided to the fronthaul link 310 for transmission to the baseband unit.

Figure 4:
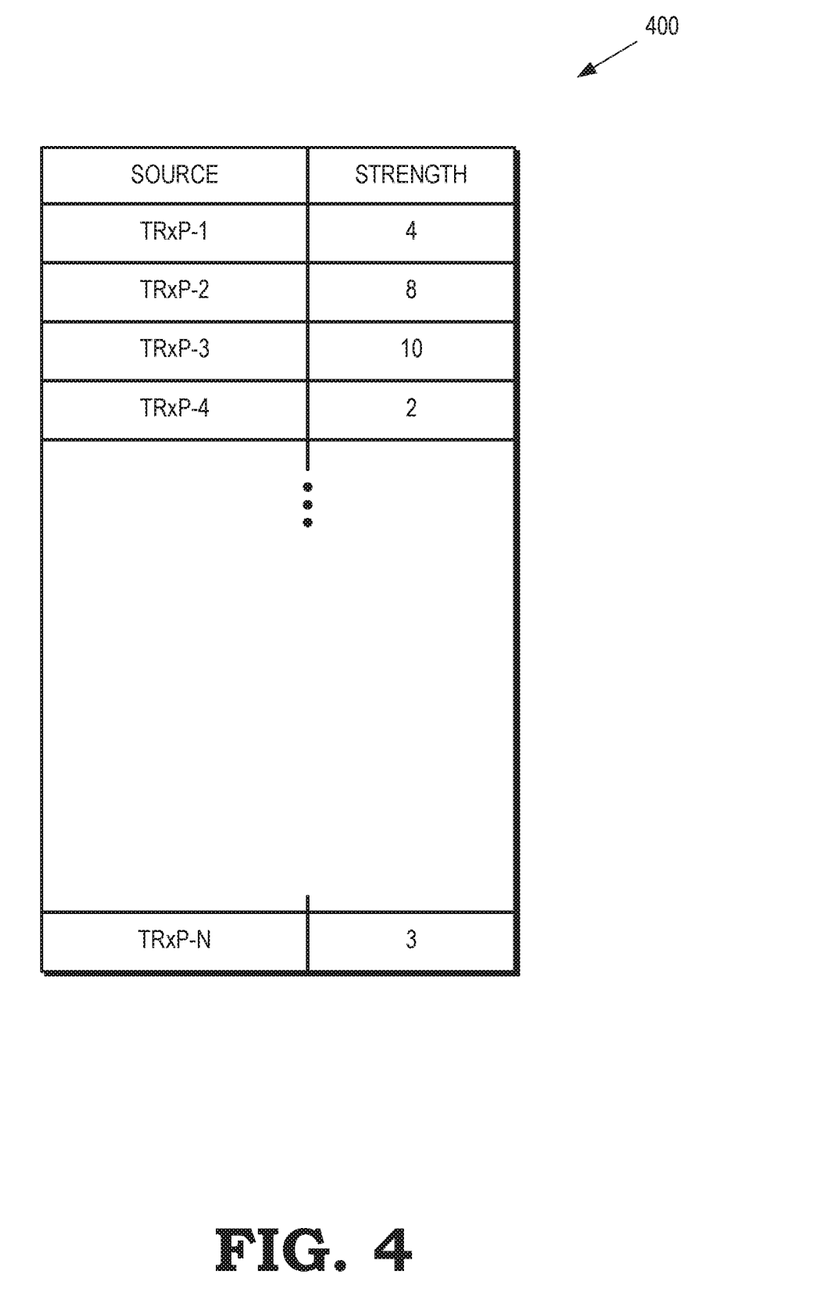
FIG. 4 is a block diagram of a measurement report that is generated by a user equipment and transmitted to a base station according to some embodiments.

FIG. 4 is a block diagram of a measurement report 400 that is generated by a user equipment and transmitted to a base station according to some embodiments. The measurement report 400 represents some embodiments of the measurement report 205 shown in FIG. 2. The measurement report 400 is generated by a user equipment based on measurements performed on unique signals received from a set of TRxPs such as measurements performed by the user equipment 105 on the TRxPs 101-104 shown in FIG. 1. The measurement report 400 includes entries for the set of TRxPs that are detected by the user equipment. A first column in the entries include information indicating an identity of the TRxP that is generated based on the information conveyed by the unique signal transmitted by the TRxP. For example, the measurement report 400 includes entries for TRxP-1, TRxP-2, TRxP-3, TRxP-4, and TRxP-N. A second column in the entries includes information indicating a measured signal strength of one or more signals received from the TRxP, such as one or more SSB, CSI-RS, and the like. For example, the measurement report 400 includes entries indicating that a signal strength of a unique signal transmitted by TRxP-1 has a value of 4, a signal strength of a unique signal transmitted by TRxP-2 has a value of 8, a signal strength of a unique signal transmitted by TRxP-3 has a value of 10, a signal strength of a unique signal transmitted by TRxP-4 has a value of 2, and a signal strength of a unique signal transmitted by TRxP-N has a value of 3.

Figure 5:
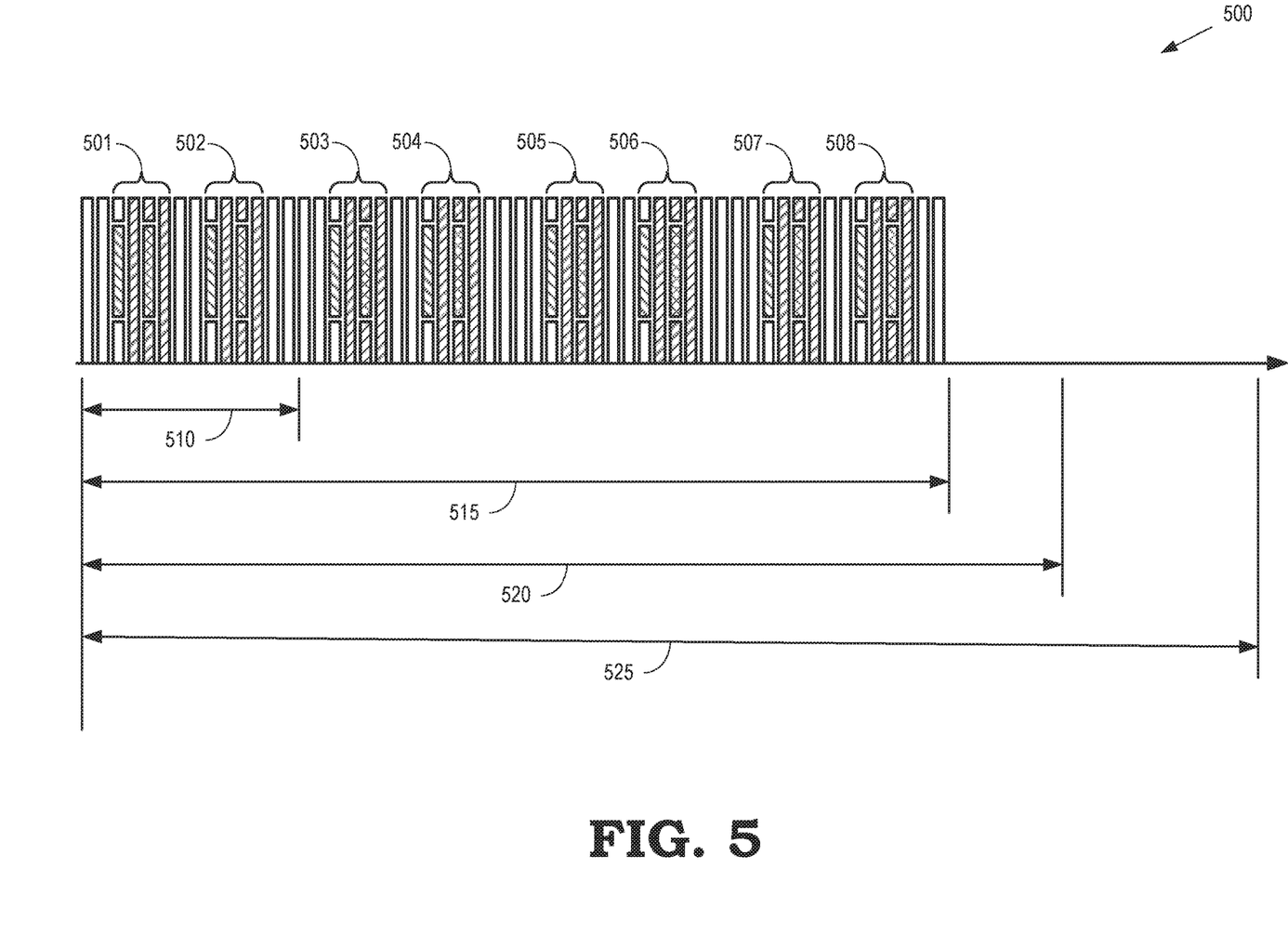
FIG. 5 is a block diagram illustrating a set of synchronization signal blocks (SSBs) that are transmitted by a set of transmission reception points (TRxPs) according to some embodiments.

FIG. 5 is a block diagram illustrating a set 500 of synchronization signal blocks (SSBs) that are transmitted by a set of TRxPs according to some embodiments. The set 500 includes a first SSB 501 that is transmitted by all the TRxPs in the set and second SSBs 502, 503, 504, 505, 506, 507, 508 that are transmitted to uniquely identify the TRxPs in the set. The first SSB 501 and the second SSBs 502, 503, 504, 505, 506, 507, 508 are collectively referred to herein as "the SSBs 501-508." Different ones of the SSBs 501-508 include different information. As discussed herein, in some embodiments, each of the second SSBs 502-508 includes information (such as encodings or patterns) that is used to uniquely identify one of the TRxPs in the set. Alternatively, the second SSBs 502-508 may be rotated between subsets of the set of TRxPs to uniquely identify the TRxPs in the subsets in different time intervals. Combinations of the second SSBs 502-508 may also be used to encode identities of the TRxPs.

The SSBs 501-508 are transmitted from a baseband unit (such as the baseband unit 115 shown in FIG. 1) to an aggregation unit (such as the aggregation unit 110 shown in FIG. 1) during slots 510 of an SSB burst 515. Some embodiments of the aggregation unit modify the second SSBs 502-508 to uniquely identify corresponding TRxPs. In some embodiments, the SSB burst 515 occupies a portion of a half frame 520, which may have a duration of 5 ms. The SSB burst 515 is repeated after a predetermined time interval or periodicity 525 such as a 20 ms periodicity. In the illustrated embodiment, the first SSB 501 is a primary SSB that covers an entire coverage area of the base station, e.g., the coverage area of an SFN or DAS. Although the SSBs 501-508 shown in FIG. 5 have equal transmission powers, the SSBs 501-508 have different transmission powers in some embodiments. For example, the SSBs 502-508 may optionally have lower transmit powers than the SSB 501 to avoid potential beam selection. Thus, the user equipment does not use one of the SSBs 502-508 for uplink random access or RACH transmission. The base station that generates the SSBs 501-508 instructs the user equipment to perform measurements on the SSBs 501-508 during the SSB sweeping period, e.g., in the SSB burst 515 of the half frame 520.

The maximum number of SSBs 501-508 that are transmitted during the periodicity 525 is typically fixed at a predetermined number such as four, eight, or 64 depending on factors including the subcarrier spacing and the carrier frequency range. The number of TRxPs that are uniquely identified is extended beyond the maximum number using one or more of the following techniques.

In some embodiments, CSI-RS signals such as tracking reference signals are combined with the SSBs to produce additional unique signals for a larger number of TRxPs. For example, if the maximum number of SSBs is eight, there are seven secondary SSBs available to uniquely identify TRxPs. If the base station uses additional physical resource blocks to transmit two sets of CSI-RS at different frequency-time resource positions, combining the CSI-RS with the SSBs generates 14 unique signals that are used to uniquely identify 14 TRxPs. Some embodiments of the aggregation unit modify the CSI-RS and the second SSBs 502-508 to form the unique signals. The user equipment then provides a measurement report including information indicating values of measurements performed on the SSBs and the CSI-RS signals. The base station uses the measurement report to determine whether to include uplink signals received from the TRxP in a summed uplink signal, as discussed herein.

In some embodiments, the secondary SSBs are rotated across the set of TRxPs in different time intervals. For example, if there are seven available second SSBs 502-508 and fourteen TRxPs, a first subset of seven TRxPs transmit the seven second SSBs 502-508 in a first time interval and a second subset of the other seven TRxPs transmit the seven second SSBs 502-508 in a second time interval. The user equipment generates different measurement reports for the different time intervals and the base station combines the measurement reports to determine the TRxPs that are included in the subset for uplink signal summation.

In some embodiments, different combinations of the second SSBs 502-508 are used to encode identities of the TRxPs. For example, a first TRxP transmits a first one of the second SSBs 502-508 and a fifth one of the second SSBs 502-508, while a second TRxP transmits the first one of the second SSBs 502-508 and a sixth one of the second SSBs 502-508. A user equipment that reports a strong signal strength (or quality) on the first one of the second SSBs 502-508 and the sixth one of the second SSBs 502-508 is therefore likely to be proximate the second TRxP. If combinations of two second SSBs are used to identify the TRxPs, then the coded representation provides 7!/(2!5!)=21 unique combinations to identify different TRxPs. The base station combines multiple SSB measurements and uses the results to decode the identity of the TRxPs and select the subsets of the TRxPs for uplink signal summation. The above description of SSB 501 as the first SSB and SSBs 502-508 as the second SSBs is intended as non-limiting example. Persons of ordinary skill in the art should appreciate that in other embodiments the first SSB is chosen from any subset of the SSBs 501-508 and the second SSBs are chosen from the remaining subset of the SSBs 501-508.

Figure 6:
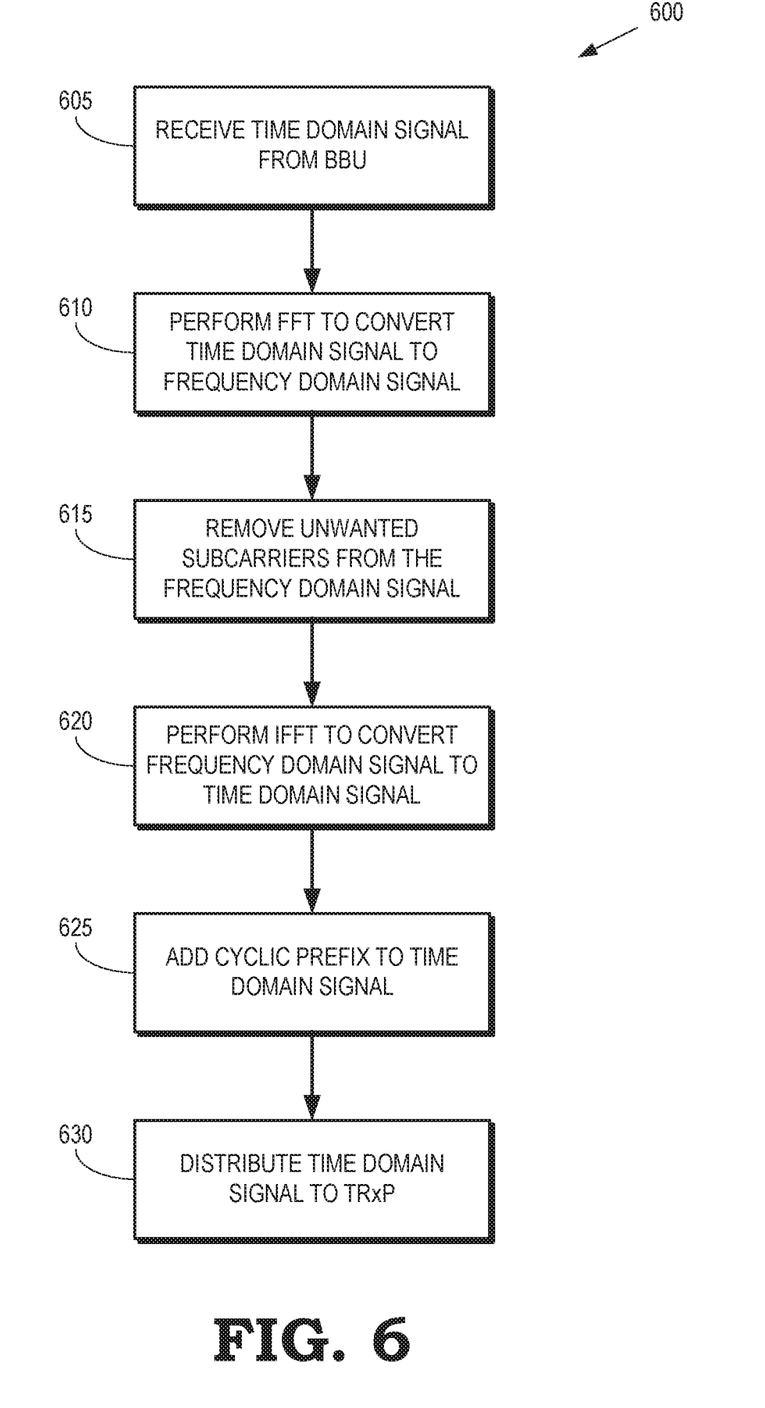
FIG. 6 is a flow diagram of a method of generating unique signals for transmission by a TRxP according to some embodiments.

FIG. 6 is a flow diagram of a method 600 of generating unique signals for transmission by a TRxP according to some embodiments. The method 600 is implemented in some embodiments of the TRxPs 101-104 shown in FIG. 1. A baseband unit transmits a common signal to an aggregation unit, which uses the common signal to generate the unique signals that are to be transmitted by a set of TRxPs, as discussed herein. In the illustrated embodiment, the baseband unit transmits time domain signals including symbols that represent the common signals.

At block 605, the aggregation unit receives the time domain signals transmitted by the baseband unit and generates the unique signals from the received time domain signals. The time domain signals include symbols representative of the common signal generated by the baseband unit. However, as discussed herein, different subsets of the unique signals are transmitted to uniquely identify corresponding TRxPs. In some embodiments, the time domain signals include symbols representative of first and second SSBs for transmission over subcarriers on different frequencies. The TRxPs are identified by transmitting different second SSBs or different combinations of the second SSBs. The aggregation unit therefore extracts the signals that are to be transmitted by a TRxP and masks off the signals that are not to be transmitted by the TRxP.

At block 610, the aggregation unit performs FFT to convert the time domain signal to a frequency domain signal including a plurality of subcarriers. The FFT is performed on a per-symbol basis to recover frequency domain subcarriers of each symbol.

At block 615, the aggregation unit removes, or masks off, unwanted subcarriers from the frequency domain signal. In some embodiments, masking off the unwanted subcarriers is performed by setting the subcarriers to zeros. Different masks are used to remove different sets of unwanted second SSBs to generate the unique signals that are transmitted to different TRxPs. For example, if the aggregation unit is generating a unique signal for transmission by a first TRxP that is identified by a first one of the second SSBs that is conveyed by a first subcarrier, the aggregation unit masks off other subcarriers so that only the first subcarrier remains in the frequency domain signal. As discussed herein, a subcarrier associated with a first SSB is also included in the frequency domain signal because the first SSB is transmitted by all the TRxPs.

At block 620, the aggregation unit performs an IFFT to convert the frequency domain signal to a time domain signal. Thus, the time domain signal produced by the aggregation unit only includes information representing the unique signal that is transmitted by the TRxP.

At block 625, the aggregation unit appends a cyclic prefix to the time domain signal.

At block 630, the aggregation unit transmits the time domain signal with the appended cyclic prefix to the corresponding TRxP, which uses the time domain signal to generate a unique signal for transmission to the user equipment.

In some embodiments, the baseband unit transmits a frequency domain signal directly to the aggregation unit or the aggregation unit generates frequency domain signals with all the first and second SSBs enabled based on information received from the baseband unit. In that case, the aggregation unit generates the unique signals by removing (or masking off) the subcarriers for symbols that are associated with the unwanted second SSBs, e.g., by setting those subcarriers to zeros, as in block 615. Different masks are used to remove different sets of unwanted second SSBs to generate the unique signals that are transmitted to different TRxPs. The aggregation unit then continues with method 600 by performing the IFFT on the filtered frequency domain signal (at block 620), appending the cyclic prefix (at block 625), and transmitting the time domain signal to the TRxP (at block 630).

Figure 7:
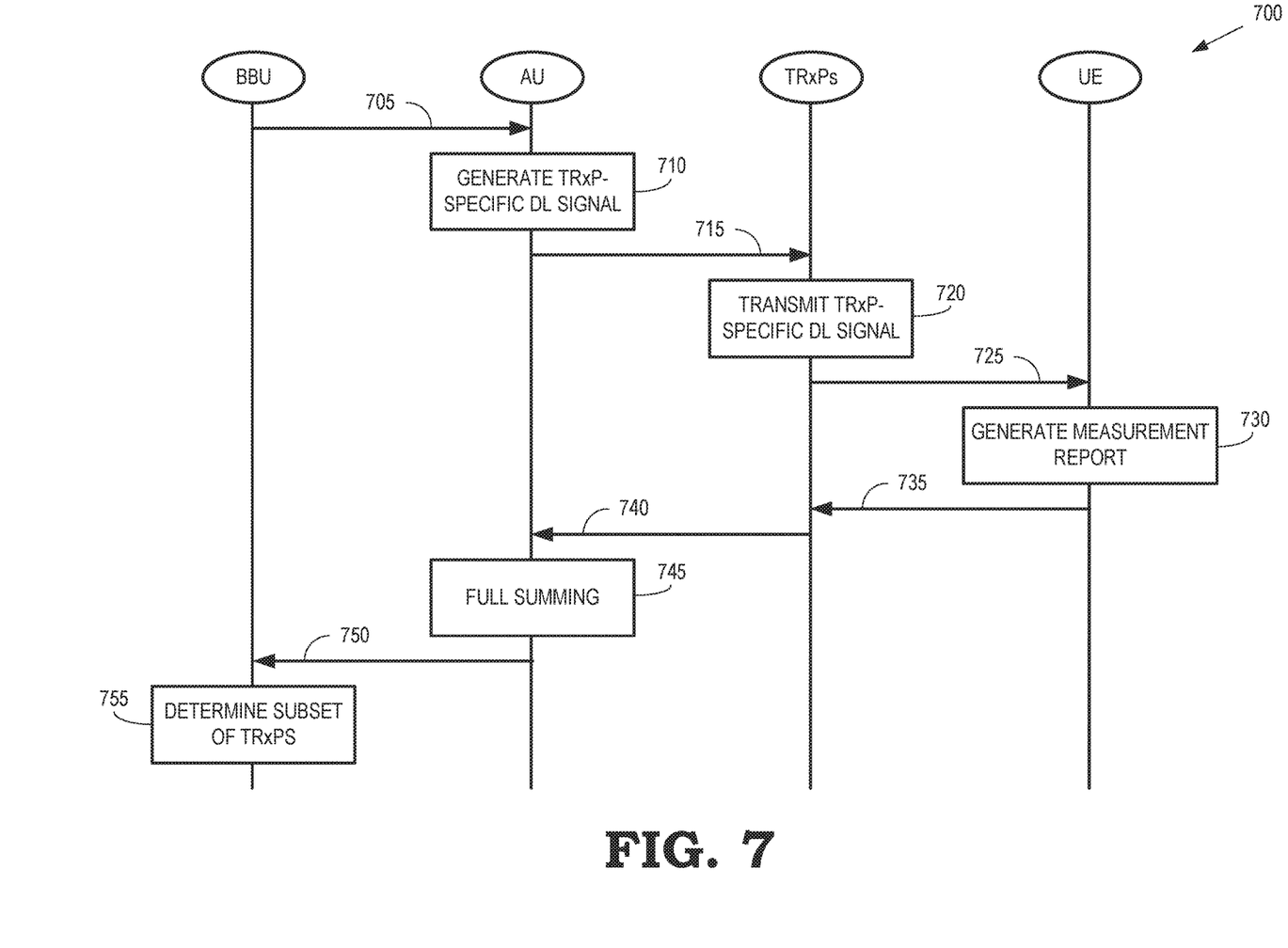
FIG. 7 is a block diagram of a messaging sequence that represents a measurement stage according to some embodiments.

FIG. 7 is a block diagram of a messaging sequence 700 that represents a measurement stage according to some embodiments. The messaging sequence 700 includes messages exchanged by a baseband unit (BBU), and aggregation unit (AU), a set of TRxPs, and the user equipment (UE). The messaging sequence 700 is therefore implemented in some embodiments of the communication system 100 shown in FIG. 1.

The BBU transmits (at arrow 705) information representing downlink signals for transmission by the set of TRxPs. The information includes frequency domain signals representative of symbols or time domain signals, as discussed herein.

At block 710, the AU generates the TRxP-specific downlink signals that uniquely identify the corresponding TRxPs. In some embodiments, the AU generates the TRxP-specific downlink signals using some embodiments of the method 600 shown in FIG. 6. The AU transmits the TRxP-specific downlink signals to the corresponding TRxPs at arrow 715.

At block 720, each of the TRxPs transmits their corresponding TRxP-specific downlink signal towards the UE, as indicated by the arrow 725. The user equipment performs signal strength or quality measurements on the received TRxP-specific downlink signals and generates a measurement report at block 730. The measurement report is then transmitted towards the set of TRxPs, as indicated by the arrow 735.

Each of the TRxPs forwards the received uplink signal including the measurement report from the UE to the AU, as indicated by the arrow 740. The AU then performs full summing of all the received uplink signals from all the TRxPs to form a summed uplink signal including the measurement report. The summed uplink signal is transmitted to the BBU, as indicated by the arrow 750, and the BBU determines (at block 755) a subset of the TRxPs that are to be used for selective summing of subsequently received signals from the UE.

Figure 8:
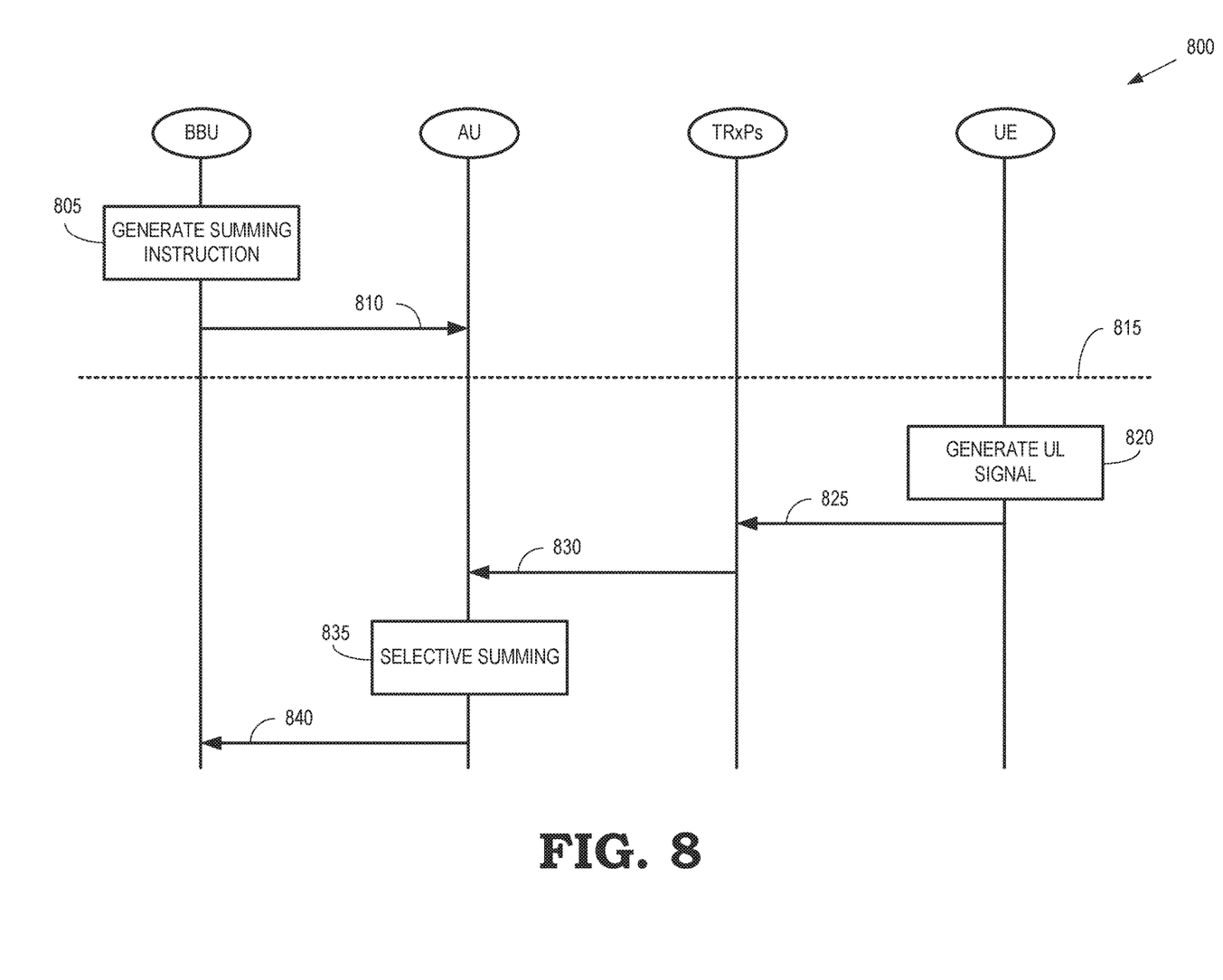
FIG. 8 is a block diagram of a messaging sequence that represents a selective summation stage according to some embodiments.

FIG. 8 is a block diagram of a messaging sequence 800 that represents a selective summation stage according to some embodiments. The messaging sequence 800 includes messages exchanged by a baseband unit (BBU), and aggregation unit (AU), a set of TRxPs, and the user equipment (UE). The messaging sequence 800 is therefore implemented in some embodiments of the communication system 100 shown in FIG. 1. Some embodiments of the messaging sequence 800 are performed subsequent to the message sequence 700 shown in FIG. 7.

At block 805, the BBU generates a summing instruction that is used to configure the AU to selectively sum uplink signals received from a subset of the set of TRxPs that was previously determined by the BBU based on the measurement report, e.g., in block 755 of the messaging sequence 700 shown in FIG. 7. The summing instruction is transmitted to the AU, as indicated by the arrow 810, which uses the summing instruction to configure a mask such as the mask 210 shown in FIG. 2. At this point, which is indicated by the dotted line 815, the AU selectively sums uplink signals received from the UE based on the mask.

At block 820, the UE generates an uplink signal for transmission to the base station including the BBU and the AU. The UE transmits the uplink signal towards the set of TRxPs, as indicated by the arrow 825.

Each of the TRxPs transmits a signal representative of the uplink signal 825 received from the UE to the AU, as indicated by the arrow 830. The AU then selectively sums (at block 835) the uplink signals received from the subset of the TRxPs that are indicated in the summing instruction received in the message 810. Some embodiments of the AU perform the selective summation as discussed with regard to FIG. 3. The AU forms a summed signal using the selective summation of the uplink signals received from the subset of the TRxPs and provides the summed signal to the BBU, as indicated by the arrow 840.

Figure 9:
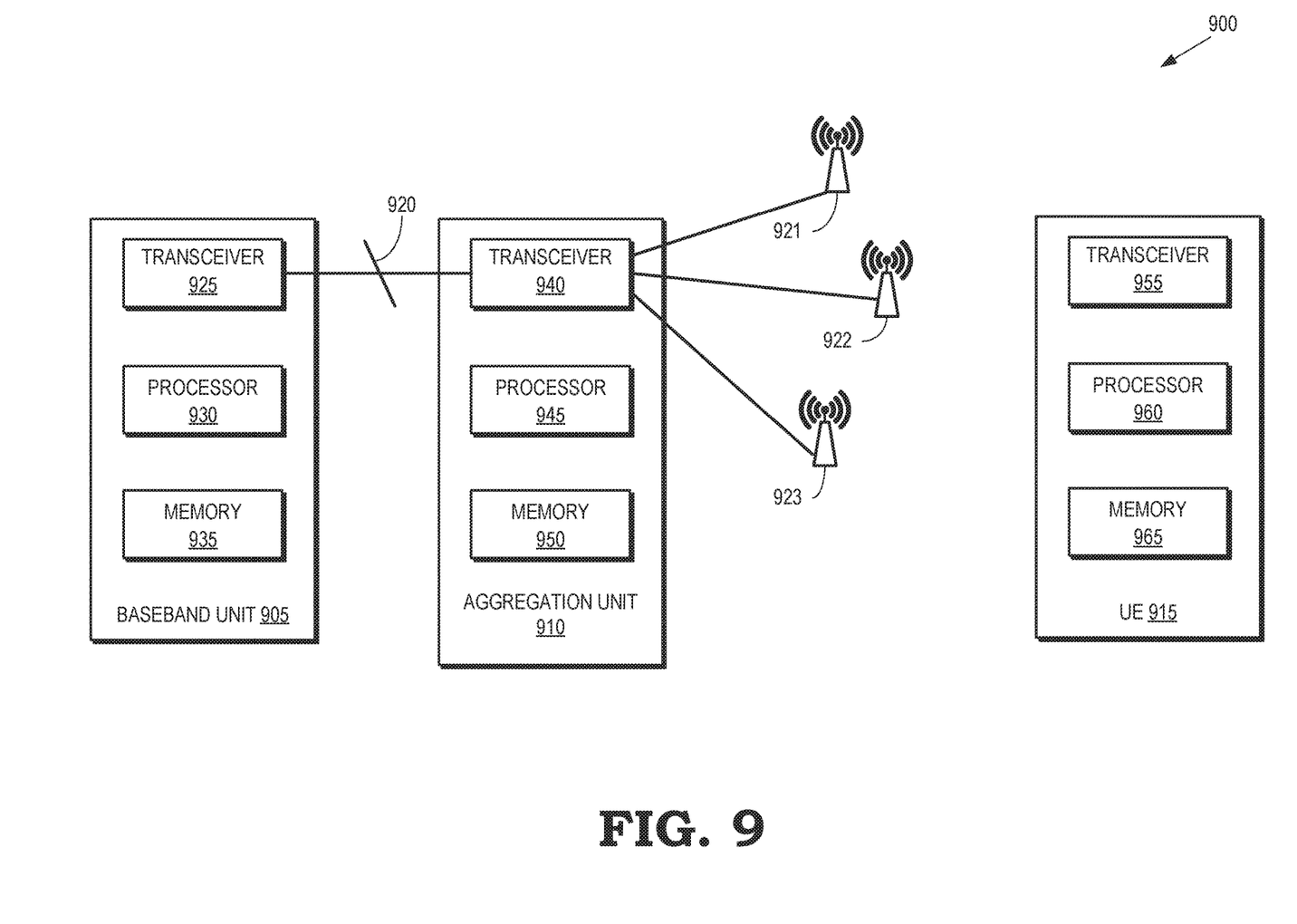
FIG. 9 is a block diagram of a communication system that supports selectively summing uplink signals from a set of TRxPs according to some embodiments.

FIG. 9 is a block diagram of a communication system 900 that supports selectively summing uplink signals from a set of TRxPs according to some embodiments. The communication system 900 includes a baseband unit 905, and aggregation unit 910, and a UE 915. The communication system 900 therefore represents some embodiments of the communication system 100 shown in FIG. 1. The baseband unit 905 is connected to the aggregation unit 910 via a fronthaul link 920 and the aggregation unit 910 distributes/consolidates signals for a set of TRxPs 921, 922, 923, which are collectively referred to herein as "the set of TRxPs 921-923."

The baseband unit 905 includes a transceiver 925 for transmitting and receiving signals with the aggregation unit 910 via the fronthaul link 920. The transceiver 925 can be implemented as a single integrated circuit (e.g., using a single ASIC or FPGA) or as a system-on-a-chip (SOC) that includes different modules for implementing the functionality of the transceiver 925. The baseband unit 905 also includes a processor 930 and a memory 935. The processor 930 can be used to execute instructions stored in the memory 935 and to store information in the memory 935 such as the results of the executed instructions. The baseband unit 905 is therefore able to perform some embodiments of the method 600 shown in FIG. 6 and the messaging sequences 700 and 800 shown in FIGS. 7 and 8, respectively.

The aggregation unit 910 includes a transceiver 940 for transmitting and receiving signals with the baseband unit 905 via the fronthaul link 920 and the TRxPs 921-923. The transceiver 940 can be implemented as a single integrated circuit (e.g., using a single ASIC or FPGA) or as a system-on-a-chip (SOC) that includes different modules for implementing the functionality of the transceiver 940. The aggregation unit 910 also includes a processor 945 and a memory 950. The processor 940 can be used to execute instructions stored in the memory 950 and to store information in the memory 950 such as the results of the executed instructions. The aggregation unit 910 is therefore able to perform some embodiments of the method 600 shown in FIG. 6 and the messaging sequences 700 and 800 shown in FIGS. 7 and 8, respectively.

The user equipment 915 includes a transceiver 955 for exchanging signals over an air interface with the set of TRxPs 921-923. The transceiver 955 can be implemented as a single integrated circuit (e.g., using a single ASIC or FPGA) or as a system-on-a-chip (SOC) that includes different modules for implementing the functionality of the transceiver 955. The user equipment 915 also includes a processor 960 and a memory 965. The processor 960 can be used to execute instructions stored in the memory 965 and to store information in the memory 965 such as the results of the executed instructions. The user equipment 915 is therefore able to perform some embodiments of the method 600 shown in FIG. 6 and the messaging sequences 700 and 800 shown in FIGS. 7 and 8, respectively.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
(a) hardware-only circuit implementations (such as implementations and only analog and/or digital circuitry) and
(b) combinations of hardware circuits and software, such as (as applicable):
  (i) a combination of analog and/or digital hardware circuit(s) with software/firmware and
  (ii) any portions of a hardware processor(s) with software (including digital signal processor(s), software, and memory(ies) that work together to cause an apparatus, such as a mobile phone or server, to perform various functions) and
(c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a transceiver configured to transmit unique signals to a plurality of transmission reception points (TRxPs) for transmission by the plurality of TRxPs and receive uplink signals received by the plurality of TRxPs from a user equipment, wherein the unique signals comprise a first synchronization signal block (SSB) that is transmitted by each of the plurality of TRxPs and a plurality of second SSBs that are selectively transmitted by different ones of the plurality of TRxPs; and
a processor configured to generate a sum of the uplink signals from a subset of the plurality of TRxPs, wherein the subset is determined based on measurements of the unique signals performed by the user equipment, and wherein the transceiver is configured to transmit the sum of the uplink signals to a baseband unit over a fronthaul link.

2. The apparatus of claim 1, wherein the transceiver is configured to transmit the first SSB to the plurality of TRxPs and a different one of the plurality of second SSBs to each of the plurality of TRxPs.

3. The apparatus of claim 1, wherein the transceiver is configured to transmit the first SSB to the plurality of TRxPs, and wherein the transceiver is configured to transmit a different one of the plurality of second SSBs to each TRxP in a first subset of the plurality of TRxPs in a first time interval and the different one of the plurality of second SSBs to each TRxP in a second subset of the TRxPs in a second time interval.

4. The apparatus of claim 1, wherein the transceiver is configured to transmit the first SSB to the plurality of TRxPs, and wherein the transceiver is configured to transmit different combinations of the plurality of second SSBs to encode identities of the plurality of TRxPs.

5. The apparatus of claim 1, wherein the processor is configured to generate the unique signals by performing a Fast Fourier Transform (FFT) on a time domain signal received from the baseband unit to generate a frequency domain signal including subcarriers for the first SSB and the plurality of second SSBs, removing subcarriers associated with a subset of the second SSBs from the frequency domain signal, performing an inverse FFT (IFFT) on the frequency domain signal to form a modified time domain signal, and adding a cyclic prefix to the modified time domain signal.

6. The apparatus of claim 1, wherein the processor is configured to generate the unique signals by removing unwanted subcarriers associated with second SSBs from a frequency domain signal received from the baseband unit, performing an inverse FFT (IFFT) on the frequency domain signal to form a modified time domain signal, and adding a cyclic prefix to the modified time domain signal.

7. The apparatus of claim 1, wherein the unique signals comprise channel state information-reference signals (CSI-RS) transmitted by the plurality of TRxPs.

8. The apparatus of claim 1, wherein the processor is configured to generate the unique signals by generating the second SSBs in response to instructions received from the baseband unit.

9. The apparatus of claim 1, wherein the processor is configured to generate a mask that indicates the subset of the plurality of TRxPs.

10. The apparatus of claim 9, wherein the processor is configured to filter uplink signals received from the plurality of TRxPs using the mask and to generate the sum by summing the filtered uplink signals.

11. A baseband unit comprising:
a transceiver configured to transmit a common signal to a plurality of transmission reception points (TRxPs) and to receive a measurement report from a user equipment, wherein the common signal comprises a first synchronization signal block (SSB) and a plurality of second SSBs that are modified by an aggregation unit to uniquely indicate each of the plurality of TRxPs, wherein the plurality of TRxPs generate unique signals based on the common signal, and wherein the measurement report indicates signal strengths of the unique signals received by the user equipment from the plurality of TRxPs; and
a processor configured to select, based on the measurement report, a subset of the plurality of TRxPs that are to be used for selective summing of uplink signals subsequently received from the user equipment.

12. The baseband unit of claim 11, wherein the processor is configured to select the subset of the plurality of TRxPs by comparing the signal strengths in the measurement report to a threshold signal strength.

13. The baseband unit of claim 12, wherein the processor is configured to include a TRxP in the subset in response to a corresponding signal strength exceeding the threshold signal strength.

14. The baseband unit of claim 11, wherein the processor is configured to generate a summing instruction, and wherein the transceiver is configured to transmit the summing instruction to an aggregation unit, which uses the summing instruction to configure the aggregation unit to selectively sum uplink signals received from the subset of the set of TRxPs.

15. The baseband unit of claim 14, wherein the transceiver is configured to receive an aggregated uplink signal that is equal to a sum of the uplink signals received from the subset of the set of TRxPs.

16. The baseband unit of claim 11, wherein the common signal comprises instructions to generate at least one of a first synchronization signal block (SSB) and a plurality of second SSBs at an aggregation unit to uniquely indicate each of the plurality of TRxPs.

17. A method comprising:
transmitting unique signals to a plurality of transmission reception points (TRxPs) for transmission by the plurality of TRxPs, wherein the unique signals comprise a first synchronization signal block (SSB) that is transmitted by each of the plurality of TRxPs and a plurality of second SSBs that are selectively transmitted by different ones of the plurality of TRxPs;
receiving uplink signals received by the plurality of TRxPs from a user equipment;
generating a sum of the uplink signals from a subset of the plurality of TRxPs, wherein the subset is determined based on measurements of the unique signals performed by the user equipment; and
transmitting the sum of the uplink signals to a baseband unit over a fronthaul link.

* * * * *